United States Patent [19]
Jacobsen et al.

[11] Patent Number: 4,635,486
[45] Date of Patent: Jan. 13, 1987

[54] ELECTROMAGNETIC FLOW METER

[75] Inventors: Hans E. Jacobsen; Henning M. Hansen, both of Nordborg; John Nyrup, Sonderborg; Henry Hansen, Grasten; Konstantin Lassithiotakis, Nordborg, all of Denmark

[73] Assignee: Danfoss A/S, Nordborg, Denmark

[21] Appl. No.: 737,462

[22] Filed: May 24, 1985

[30] Foreign Application Priority Data

Jun. 6, 1984 [DE] Fed. Rep. of Germany ....... 3420963

[51] Int. Cl.4 .............................................. G01F 1/58
[52] U.S. Cl. ................................................. 73/861.12
[58] Field of Search ....................... 73/861.12; 336/30

[56] References Cited

U.S. PATENT DOCUMENTS 3,406,569 10/1968 Rohmann .......................... 73/861.12
4,181,018 1/1980 Schmoock ......................... 73/861.12

Primary Examiner—Donald O. Woodiel
Attorney, Agent, or Firm—Wayne B. Easton

[57] ABSTRACT

The invention relates to an electromagnetic flow meter with a magnetic system having two magnetic poles which are attachable to a measuring tube from the outside, an outer yoke, and at least one separating gap. Each pole has a pole shoe and a core section carrying a winding which is connected at the radially outward end thereof without a gap to the adjoining magnetic system portion and the separating gap is disposed beyond the magnetic path for the stray flux.

8 Claims, 5 Drawing Figures

ELECTROMAGNETIC FLOW METER

The invention relates to an electromagnetic flow meter with a magnetic system consisting of two magnetic poles which are attachable to a measuring tube from the outside and each comprise a pole shoe and a core section carrying a winding, an outer yoke, and at least one separating gap.

In a known flow meter of this kind (EU-OS 80 535), the pole shoes of two magnetic poles lie against a ceramic measuring tube and are diametrally opposed. A steel housing serves as the yoke for the magnetic return flux. This is a separating gap between the radially outer end of the core section of each magnetic pole and the associated yoke. By means of the separation produced along the gap, it is possible to mount the magnetic system to function properly even though the end of the measuring tube has connecting flanges of larger diameter.

In this construction, the magnetic system considerably projects radially beyond the flanges of the measuring tube. This results in comparatively larger external dimensions. In addition, the magnetic system in many cases obstructs the passage of throughbolts which serve to clamp the flow meter between the flanges of two connecting tubes. The disposition and number of such clamping bolts is prescribed by the appropriate Standard.

The invention is based on the problem of reducing the magnetic system in an electromagnetic flow meter of the aforementioned kind so that under otherwise equal conditions there will be smaller overall dimensions and it will in particular be possible to accommodate it within the space defined by the clamping bolts.

According to the invention, this problem is solved in that the core section is connected at the radially outer end without a gap to the adjoining magnetic system portion and the separating gap is disposed beyond the magnetic path for the stray flux.

In an electromagnetic flow meter, the total magnetic flux is divided into a useful flux flowing from one pole shoe to the other and passing through the measuring tube and a stray flux flowing from the pole shoe directly to the portion of the magnetic system adjoining the core section. Since the stray flux has to travel through non-magnetic material along a much shorter path, it is generally larger than the useful flux, for example 3 times as large. Hitherto, the total flux had to be led across the separating gap and this caused very high induction in the gap. In contrast, if one follows the invention by passing only the useful flux across the gap instead of the stray flux, the induction is lower. Consequently, a much smaller magnetic potential difference will suffice for producing an adequate useful flux. The number of ampere turns is less. The dimensions of the winding can be kept smaller.

In a further development of the invention, the separating gap should extend over a larger area than does the cross-section of the core section. A considerably larger area should be aimed at, for example from four to twenty times larger. In this way, the conduction in the separating gap is again considerably reduced. Further, the magnetic potential difference and thus the number of ampere turns can again be reduced.

If one employs both features simultaneously, the number of ampere turns can be reduced by 20 to 30%. This corresponds to a reduction in coil volume to about one half. The reason is that on the one hand the longer outer convolutions can be dispensed with and on the other hand the wire cross-section can be smaller because of the shorter wire length while maintaining the resistance of the wire.

That part of the magnetic potential difference required for bringing the useful flux across the gap can be readily reduced to 1% or less, preferably to even less than 0.3% of the entire magnetic flux. In this case, the separating gap can even be about 0.2 mm wide. This value can be maintained even in the case of mass production. If, by reason of unavoidable tolerances, the separating gap has different dimensions, the resulting errors are so small that they do not affect the measuring result.

In a preferred embodyment, the core section is connected without a gap to an intermediate plate projecting beyond the winding to receive the stray flux and defining the gap between itself and the yoke. In this case, the stray flux travels from the rim of the pole shoe direct to the intermediate plate and need therefore not traverse any separating gap.

In an alternative construction, the core section is connected to the yoke without a gap and the yoke is segmented to form the separating gap. In this case, the stray flux travels from the rim of the pole shoe directly into the yoke. Again, it need not traverse a separating gap.

To avoid gaps between the core section and the adjoining portion of the magnetic system, there are various possibilities. Thus, both parts may be made in one piece. One may also use laminae extending perpendicular to the measuring tube axis and covering the respective core section and the adjoining portion of the magnetic system. It is also possible for the core sections and adjoining portion of the magnetic system to be interconnected in a magnetically conductive manner. This occurs, for example, by joining them with magnetically conductive solder. Ferrous parts could also be welded together, whether by electron beam welding or pressure welding.

With particular advantage, the winding is a disc winding. Since the number of turns can be considerably reduced while maintaining a relatively low effective resistance, it is possible to make the winding very flat and thereby keep the diameter of the appliance extraordinarily small. In addition, the diameter of the core section can be reduced.

Preferred examples of the invention will now be described in more detail with reference to the drawing, wherein.

Figure 1:
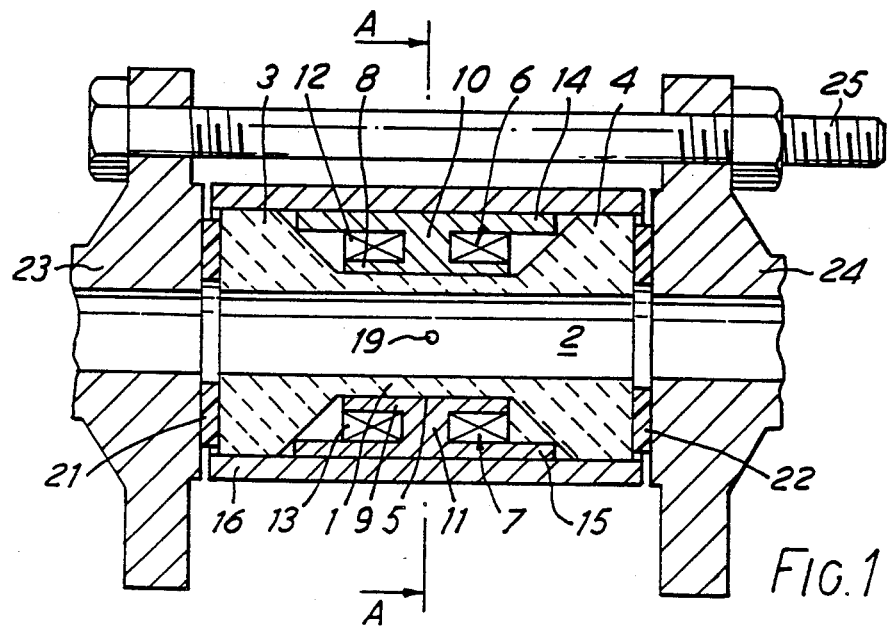
FIG. 1 is a longitudinal section through an electro magnetic flow meter constructed in accordance with the invention.
Figure 2:
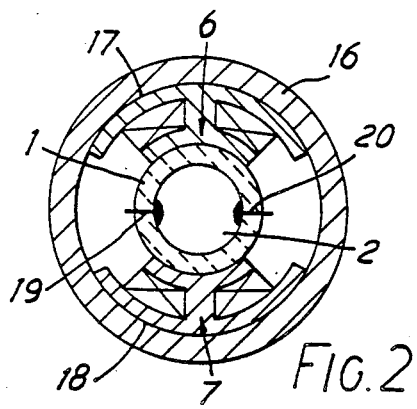
FIG. 2 is a cross-section along the line A—A in FIG. 1.

According to FIGS. 1 and 2, a measuring tube 1 is provided having an axial flow passage 2 and a flange 3, 4 at each end. This measuring tube is of electrically insulating plastics material or preferably ceramic.

Magnetic poles 6 and 7 are provided on opposite sides. These magnetic poles each possess a pole shoe 8 or 9 lying against the outside of the measuring tube 1 and a core section 10 or 11 surrounded by a disc winding 12 or 13. Connected in one piece therewith there is an intermediate plate 14 or 15 which projects axially as well as circumferentially beyond the winding 12 or 13 and the pole shoe 8 or 9. A cylindrical yoke 16 made of magetically conductive material in the same way as the elements 8, 9, 10, 11, 14, 15 surrounds the flanges 3 and 4 as well as the magnetic poles 6 and 7. Consequently, one obtains a first separating gap 17 between the yoke 16 and intermediate plate 14 and a second separating gap 18 between the yoke 16 and intermediate plate 15.

Two measuring electrodes 19 and 20 are disposed at the inner wall of the measuring tube 1 on opposite sides. Their axis is perpendicular to the plane of symmetry of the magnetic poles 6 and 7. In operation, a current passing through the windings 12 and 13 produces a magnetic field which passes radially through the passage 2. A voltage signal depending on the flow velocity can then be tapped between the measuring electrodes 19 and 20.

The flow meter is clamped between two connecting conduits 23 and 24 with the interpositioning of seals 21 and 22. Clamping bolts 25 disposed in a circle about the axis of the measuring tube pass through flanges of the connecting conduits. The sleeve-like yoke 16 has an external diameter which is entirely disposed radially within the clamping bolts.

Figure 3:
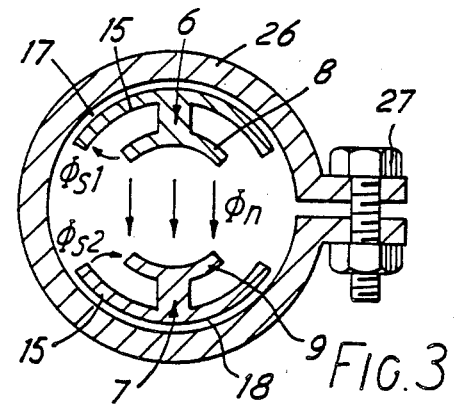
FIG. 3 is a cross-section corresponding to FIG. 2 through the magnetic system of a modified embodiment.

FIG. 3 differs from the embodiment of FIGS. 1 and 2 in that the yoke 26 is formed by a clamping strap which can be tightened by means of a clamping screw 27. The clamping strap is axially shorter than the yoke 16 and only acts on the two magnetic poles 6 and 7, not on the flanges 3 and 4. Consequently, the separating gaps 17 and 18 between the yoke and the intermediate plates 14 and 15 of the magnetic poles 6 and 7 can be reduced.

The magnetic flux has been entered in FIG. 3. There is the useful magnetic flux $\phi_n$, which passes through the passage 2 and is closed by the yoke 26 and the two separating gaps 17 and 18. The stray flux $\phi_{s1}$ goes direct from the pole shoe 8 to the intermediate plate 15, i.e. it does not pass through the separating gap 17. The stray flux $\phi_{s2}$ goes direct from the intermediate plate 15 to the pole shoe 9 and therefore likewise does not pass through the gap 18. The induction in the two separating gaps 17 and 18 is reduced by a multiple as compared with the known cases because the much larger stray flux does not pass through the separating gap and because the area bounding the separating gap is considerably larger than the cross-sectional area of the core section 10 or 11. Consequently, a very small part of the magnetic potential difference will suffice to overcome the magnetic gaps. The reduced number of ampere turns leads to very small cross-sectional dimensions for the coils 12 and 13 and thus to a very small outer circumference for the yoke.

Figure 4:
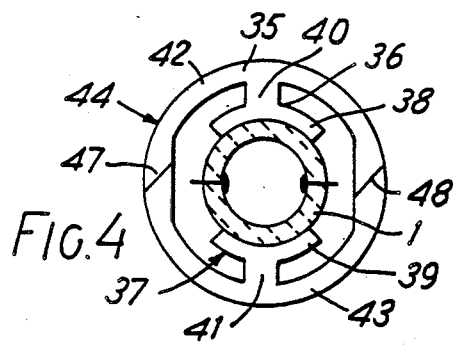
FIG. 4 is a cross-section through a further embodiment.

In the FIG. 4 embodiment, the magnetic system is composed of laminae 35. The magnetic poles 36 or 37 again consist of poles shoes 38 or 39 and core sections 40 or 41, respectively. The latter are made in one piece with yoke segments 42 or 43 together defining the yoke 44. The separating gaps 47 and 48 are disposed at circumferential portions offset by about 90% from the core sections 40, 41. To increase their bounding surfaces, the separating gaps 47 and 48 lie obliquely to the radial direction and in a zone of increased radial width.

Figure 5:
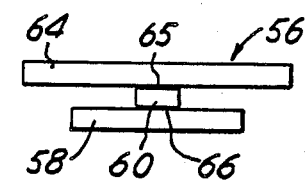
FIG. 5 is a side elevation of a modified form of magnetic pole.

FIG. 5 shows that a magnetic pole 56 can also be built up from individual parts, namely a pole shoe 58, a core section 60 and an intermediate plate 64, if one ensures that a magnetically conductive seam 65 or 66 is provided at the junctions. This seam can be produced with the aid of a magnetically conductive solder or by welding.

The yoke need not be cylindrical but could, for example, be polygonal, e.g. square, if space permits.

What is claimed is:

1. An electromagnetic flow meter, comprising a measuring tube of an electrically insulating material having a cylindrically shaped section, a magnetic system having two magnetic poles with pole shoes thereto attachable externally to diametrically opposite sides of said measuring tube, said poles including core sections carrying windings connected to said shoes, outer yoke means surrounding said poles, said poles including radially outward plate means connected to said core sections which extend circumferentially beyond said windings to receive stay flux from said pole shoes, and said yoke means having separating gap means associated therewith disposed beyond the magnetic path of said stray flux emanating from either of said pole shoes, said gap means being disposed between said plate means and said poles means.

2. A flow meter according to claim 1 characterized in that said separating gap means extend over a larger area than does the cross-section of either of said core sections.

3. A flow meter according to claim 1 characterized in that said core sections are connected without a gap to said yoke means and said yoke means is segmented to form said separating gap means.

4. A flow meter according to claim 1 characterized in that said core sections are made in one piece with said plate means.

5. A flow meter according to claim 1 characterized in that said core sections are made in one piece with said yoke means.

6. A flow meter according to claim 1 characterized in that said yoke means comprise laminae perpendicular to the axis of said measuring tube.

7. A flow meter according to claim 1 wherein an adjoining magnetic system portion surround said core sections is magnetically conductively interconnected with said core sections.

8. A flow meter according to claim 1 characterized in that said windings are disk windings.

* * * * *